(12) United States Patent
Rogers et al.

(10) Patent No.: US 8,276,989 B2
(45) Date of Patent: Oct. 2, 2012

(54) PIVOT PIN AND SADDLE ASSEMBLY FOR A SIDE-DUMP TRAILER OR TRUCK

(76) Inventors: Ralph R. Rogers, Dakota Dunes, SD (US); Bobby Rogers, North Sioux City, SD (US)

( * ) Notice: Subject to any disclaimer, the term of this patent is extended or adjusted under 35 U.S.C. 154(b) by 286 days.

(21) Appl. No.: 12/803,883

(22) Filed: Jul. 8, 2010

(65) Prior Publication Data
US 2012/0007410 A1 Jan. 12, 2012

(51) Int. Cl.
*B60P 1/16* (2006.01)
(52) U.S. Cl. ............... 298/17.7; 298/17.5; 298/17.6; 298/18
(58) Field of Classification Search ............... 298/13, 298/17.5, 17.6, 17.7, 17.8, 18, 22 P
See application file for complete search history.

(56) References Cited

U.S. PATENT DOCUMENTS

| 5,480,214 A | 1/1996 | Rogers |
| 5,845,971 A | 12/1998 | Rogers |
| 5,967,615 A | 10/1999 | Rogers |
| 6,056,368 A | 5/2000 | Rogers |
| 6,089,670 A | 7/2000 | Rogers |
| 6,179,385 B1 | 1/2001 | Rogers |
| 6,199,955 B1 | 3/2001 | Rogers |
| 6,257,670 B1 | 7/2001 | Rogers |
| 6,402,453 B1 | 6/2002 | Jensen et al. |
| 6,425,726 B1 | 7/2002 | Jensen et al. |
| 6,428,264 B1 | 8/2002 | Jensen et al. |
| 6,520,589 B2 | 2/2003 | Jensen et al. |
| 7,360,843 B1 | 4/2008 | Rogers |
| 7,478,883 B1 | 1/2009 | Rogers |
| 7,611,187 B1 | 11/2009 | Rogers |
| 7,789,467 B2 | 9/2010 | Rogers |
| 2005/0194831 A1* | 9/2005 | Huenke .................. 298/1 A |

* cited by examiner

*Primary Examiner* — Stephen Gordon
(74) *Attorney, Agent, or Firm* — Dennis L. Thomte; Thomte Patent Law Office LLC

(57) ABSTRACT

A pivot pin and saddle assembly is provided for a side-dump trailer or truck with the pivot pin and saddle assembly including structure which limits the relative movement between the side-dump body of the trailer or truck with respect to the frame of the trailer or truck. The saddle assembly of this invention includes a bearing block comprised of Nylon® or other composite material which supports the pivot pin to prevent metal-to-metal contact between the pivot pin and the associated saddle assembly.

20 Claims, 7 Drawing Sheets

PIVOT PIN AND SADDLE ASSEMBLY FOR A SIDE-DUMP TRAILER OR TRUCK

BACKGROUND OF THE INVENTION

1. Field of the Invention

This invention relates to an improved pivot pin and saddle assembly for a side-dump trailer or truck. More particularly, a plurality of the saddle assemblies are secured to the frame of the truck or trailer upon which the side-dump body is movably positioned with the saddle assemblies receiving pivot pins secured to the side-dump body. Even more particularly, the saddle assemblies of this invention pivotally support the pivot pins of the side-dump body upon a Nylon® or composite bearing block. The design of the pivot pins and saddle assemblies prevents longitudinal movement of the side-dump body with respect to the truck or trailer frame.

2. Description of the Related Art

In recent years, side-dump bodies mounted on trailers or trucks have become extremely popular. The assignee of the instant invention has obtained many patents on side-dump bodies with one of the first patents being U.S. Pat. No. 5,480,214 to Ralph Rogers.

In most of Applicants' prior art patents relating to side-dump trailers and in most of the side-dump bodies of the competitors of assignee, the side-dump bodies are pivotally mounted on a truck or trailer frame in a manner so that they may be dumped to either side of the truck or trailer frame. In most cases, pivot pins are secured to the sides of the side-dump body with the pivot pins being received in saddle assemblies mounted on the trailer or truck frame. To the best of Applicants' knowledge, no one working in the side-dump body industry has provided pivot pin and saddle assemblies which adequately limit the longitudinal movement of the side-dump body with respect to the truck or trailer frame. Further, to the best of Applicants' knowledge, all the prior art side-dump bodies have metal-to-metal contact between the pivot pins and the saddle assemblies. In that situation, the pivot pins and saddle assemblies may become worn which will eventually effect the operation of the side-dump body with respect to those saddle assemblies which will then require repair or replacement of the pivot pins and saddle assemblies.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A pivot pin and saddle assembly is disclosed for use with a side-dump trailer or truck. The side-dump trailer or truck includes a wheeled frame having a forward end, a rearward end, a first side and a second side. An elongated side-dump body is movably positioned on the wheeled frame and has a forward end, a rearward end, a first side and a second side. The side-dump body also includes an upstanding front bulkhead with upper and lower ends, an upstanding back bulkhead with upper and lower ends, a first side wall having forward and rearward ends, a second side wall having forward and rearward ends, a bottom wall having forward and rearward ends, and an open upper end for receiving materials therein to be transported. A first diagonally extending pivot tube, having upper and lower ends, is secured to the front bulkhead. The upper end of the first pivot tube is positioned adjacent the upper end of the front bulkhead with the first pivot tube extending downwardly and outwardly from its upper end to its lower end. A second diagonally extending pivot tube, having upper and lower ends, is secured to the front bulkhead with the upper end of the second pivot tube being positioned adjacent the upper end of the front bulkhead. The second pivot tube extends downwardly and outwardly from its upper end to its lower end. A third diagonally extending pivot tube, having upper and lower ends, is secured to the back bulkhead. The upper end of the third pivot tube is positioned adjacent the upper end of the back bulkhead with the third pivot tube extending downwardly and outwardly from its upper end to its lower end. A fourth diagonally extending pivot tube, having upper and lower ends, is secured to the back bulkhead with the upper end of the fourth pivot tube being positioned adjacent the upper end of the back bulkhead. The fourth pivot tube extends downwardly and outwardly from its upper end to its lower end.

A first horizontally disposed pivot pin, having forward and rearward ends, is secured to the lower end of the first diagonally extending pivot tube with the first pivot pin having a first disc-shaped ring member mounted thereon rearwardly of its forward end and a second disc-shaped ring member mounted thereon forwardly of its rearward end. The first and second disc-shaped ring members are horizontally spaced-apart on the first pivot pin.

A second horizontally disposed pivot pin, having forward and rearward ends, is secured to the lower end of the second diagonally extending pivot tube with the second pivot pin having a first disc-shaped ring member mounted thereon rearwardly of its forward end and a second pivot pin having a disc-shaped ring member mounted thereon forwardly of its rearward end. The first and second disc-shaped ring members are horizontally spaced-apart on the second pivot pin.

A third horizontally disposed pivot pin, having forward and rearward ends, is secured to the lower end of the third diagonally extending pivot tube with the third pivot pin having a first disc-shaped ring member mounted thereon rearwardly of its forward end and a second disc-shaped ring member mounted thereon forwardly of its rearward end. The first and second disc-shaped ring members are horizontally spaced-apart on the third pivot pin.

A fourth horizontally disposed pivot pin, having forward and rearward ends, is secured to the lower end of the fourth diagonally extending pivot tube with the fourth pivot pin having a first disc-shaped ring member mounted thereon rearwardly of its forward end and having a second disc-shaped ring member mounted thereon forwardly of its rearward end. The first and second disc-shaped ring members are horizontally spaced-apart on the fourth pivot pin.

A first saddle assembly is secured to the wheeled frame adjacent the lower end of the first pivot tube and a second saddle assembly is secured to the wheeled frame adjacent the lower end of the second pivot tube. A third saddle assembly is secured to the wheeled frame adjacent the lower end of the third pivot tube. A fourth saddle assembly is secured to the wheeled frame adjacent the lower end of the fourth pivot tube. The first, second, third and fourth pivot pins are selectively pivotally received by the first, second third and fourth saddle assemblies respectively. A locking device is associated with each of the saddle assemblies to selectively lock the pivot pin in the saddle assembly. Each of the first, second, third and fourth pivot pins and the first, second, third and fourth saddle assemblies include means thereon for limiting the longitudinal movement of the side-dump body with respect to the saddle assembly and the wheeled frame. Further, the pivot pins of the side-dump body are supported upon Nylon® bearing blocks positioned on the saddle assemblies with each of the bearing blocks having a semi-circular recess formed therein which partially receives the associated pivot pin. The side-dump body may be pivotally movable between a transport position to a dumping position at either side of the truck or trailer.

It is therefore a principal object of the invention to provide an improved pivot pin/saddle assembly for a side-dump trailer or truck.

A further object of the invention is to provide a pivot pin/saddle assembly for a side-dump trailer or truck which limits the longitudinal movement of the side-dump body with respect to the trailer or truck frame.

A further object of the invention is to provide a saddle assembly for a side-dump trailer or truck which includes a Nylon® or composite bearing block which supports the associated pivot pin thereon.

A further object of the invention is to provide a pivot pin/saddle assembly for a side-dump trailer which prevents the metal-to-metal contact normally associated with the pivot pins and saddle assemblies of conventional side-dump trailers or trucks.

These and other objects will be apparent to those skilled in the art.

BRIEF DESCRIPTION OF THE DRAWINGS

Non-limiting and non-exhaustive embodiments of The present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
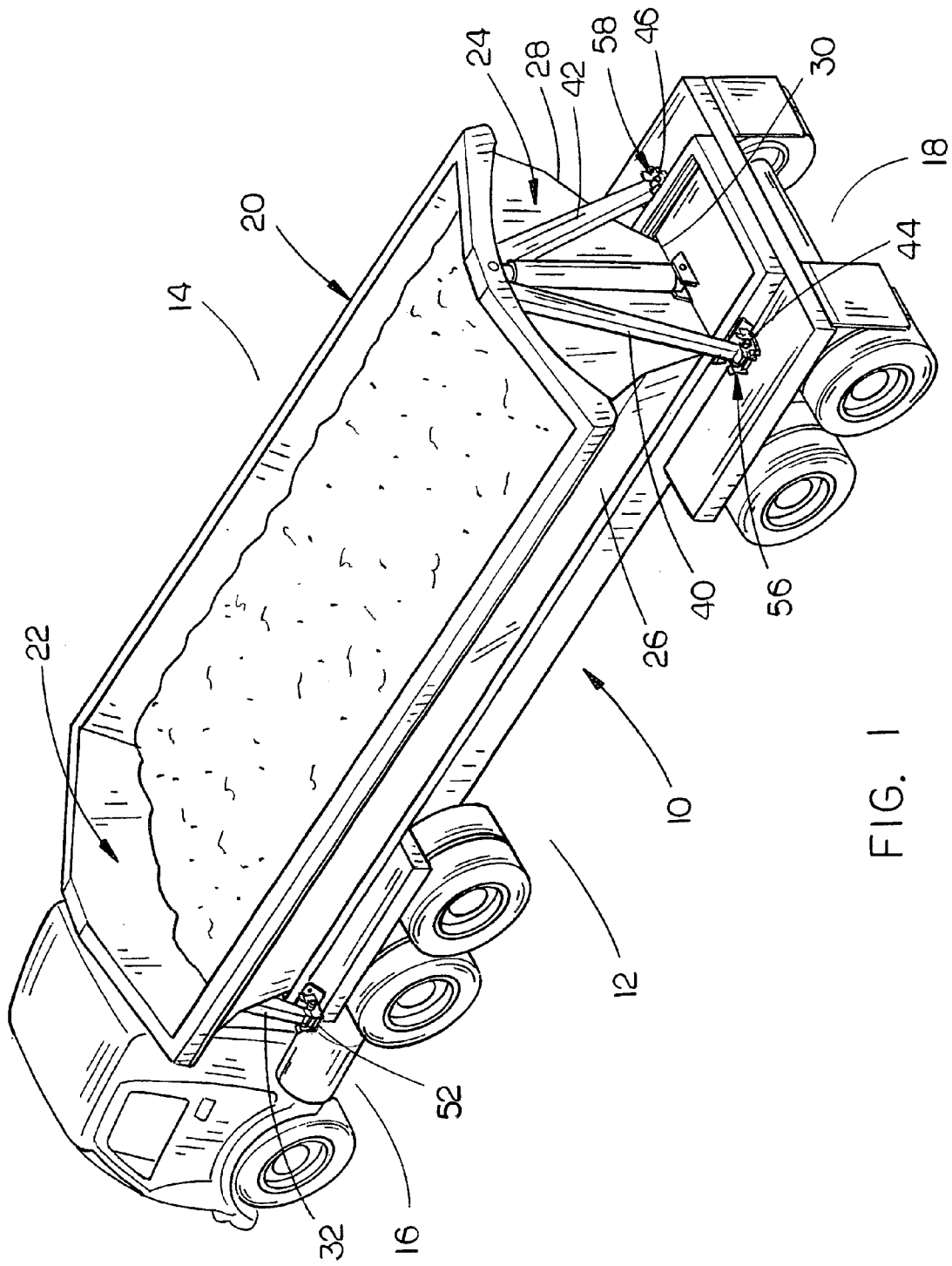
FIG. 1 is a rear perspective view of a side-dump trailer having a plurality of pivot pin/saddle assemblies of this invention secured thereto.
Figure 2:
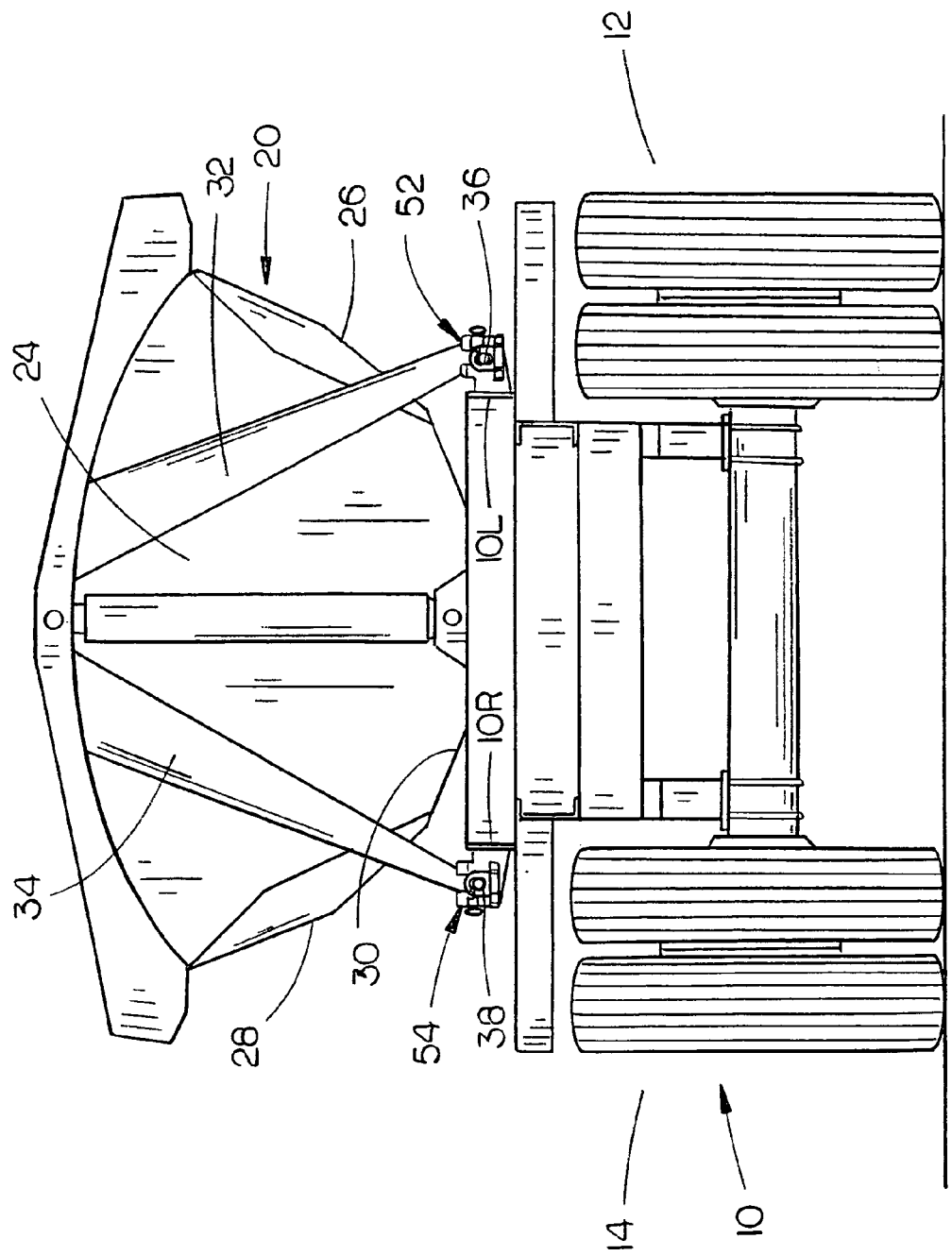
FIG. 2 is a front view of the side-dump body of FIG. 1.

In FIGS. 1, 2, 4-6, the numeral 10 refers generally to a wheeled frame which may be part of a truck or trailer. For purposes of description, the wheeled frame 10 will be described as having a left side 12, a right side 14, a forward end 16, and a rearward end 18. A conventional side-dump body such as disclosed in U.S. Pat. No. 5,480,214 is illustrated in FIGS. 1 and 2 and is referred to generally by the reference numeral 20. For purposes of description, side-dump body 20 will be described as having a forward end wall or bulkhead 22, a rearward end wall or bulkhead 24, a first side wall 26, a second side wall 28, and a bottom wall 30 which may be curved or flat. Bottom wall 30 may be integrally formed with side walls 26 and 28.

A pair of diagonally extending pivot tubes 32 and 34 are secured to the forward side of forward bulkhead 22 and have longitudinally extending pivot pins 36 and 38 secured to the lower ends respectively. A pair of diagonally extending pivot tubes 40 and 42 are secured to the rearward side of rearward bulkhead 24 and have longitudinally extending pivot pins 44 and 46 secured thereto respectively. Inasmuch as the pivot pins 36, 38, 44 and 46 are identical, only pivot pin 36 will be described in detail. Pivot pin 36 has a pair of spaced-apart, disc-shaped ring members 48 and 50 secured thereto by welding or the like.

A saddle assembly 52 is secured to the web of frame member 10L as seen in FIG. 2 by bolts or the like so as to be positioned below the lower end of pivot tube 32. Saddle assembly 54 is secured to the web of frame member 10R as seen in FIG. 2 by bolts or the like so as to be positioned below the lower end of pivot tube 34. Saddle assembly 56 is secured to the web of frame member 10L as seen in FIG. 1 by bolts or the like so as to be positioned below the lower end of pivot tube 40. Saddle assembly 58 is secured to the web of frame member 10R so as to be positioned below the lower end of pivot tube 42.

Inasmuch as saddle assemblies 52 and 56 are identical, only saddle member 52 will be described in detail. Inasmuch as saddle assemblies 54 and 58 are identical, only saddle assembly 54 will be described in detail. The only difference between saddle assemblies 52 and 54 is the location of the locking devices as will be described in more detail hereinafter. All of the saddle assemblies described above could be constructed identical to saddle assembly 52 if so desired as will be explained hereinafter.

Figure 3:
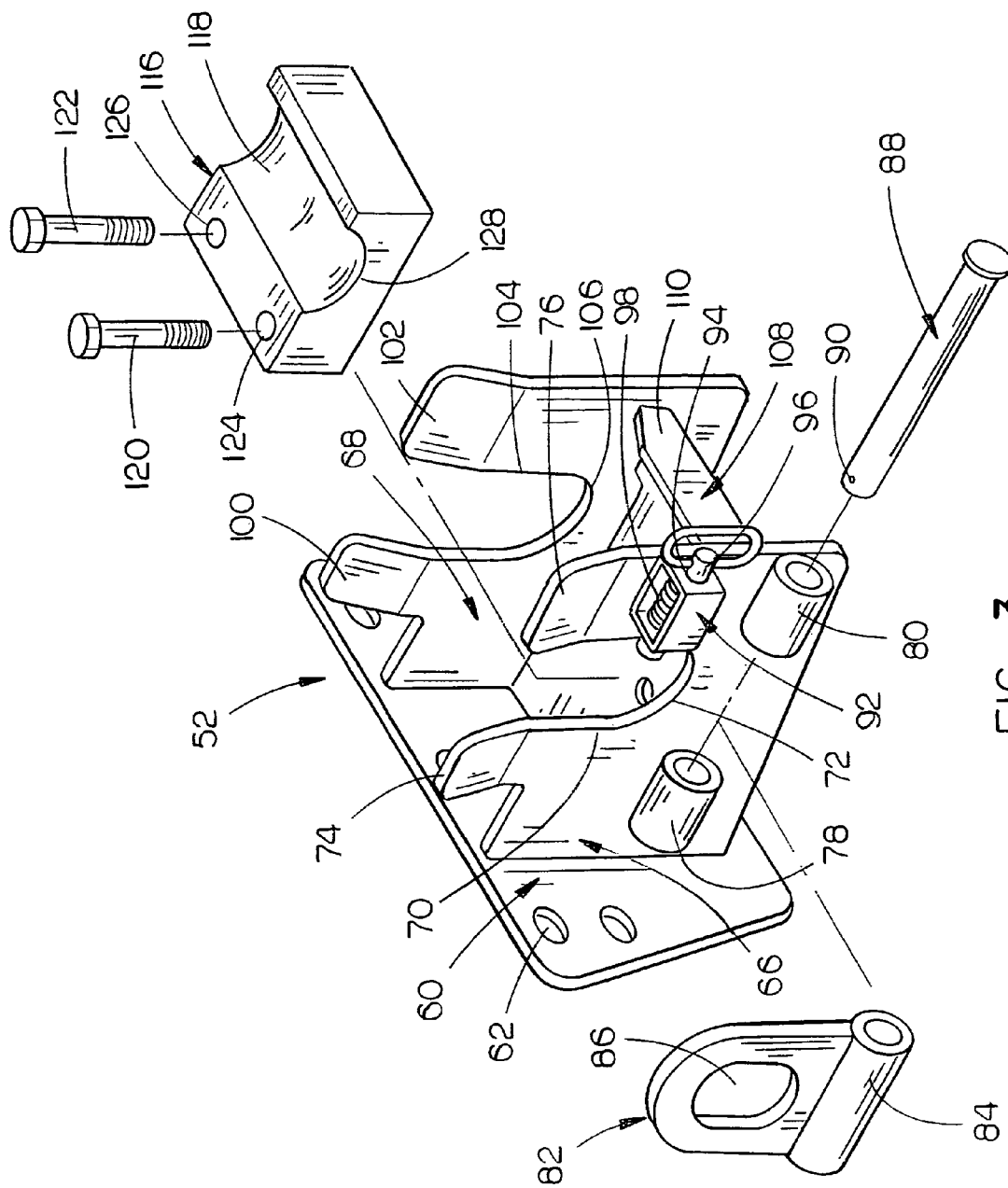
FIG. 3 is an exploded front perspective view of the saddle assembly, two of which are secured to the left side of the trailer or truck frame.

Saddle assembly 52 includes a vertically disposed mounting plate 60 having bolt openings 62 formed therein. Mounting plate 60 is bolted to the web of frame member 10L by bolt 64 extending through opening 62 and through registering bolt openings in frame member 10L. Horizontally spaced-apart front and back side plates 66 and 68 are welded to mounting plate 60 and extend outwardly therefrom as seen in the drawings. Front side plate 66 has a generally U-shaped pivot pin receiving opening 70 formed therein which has a generally semi-circular lower end 72. Front side plate 66 has a pair of spaced-apart ears 74 and 76 at its upper end which are bent forwardly as seen in FIG. 3. The forward side of side plate 66 has a pair of spaced-apart collars or bushings 78 and 80 welded thereto. The numeral 82 refers to a locking plate which has a tube or sleeve 84 at its lower end. Locking plate 82 includes an opening 86 formed therein. Sleeve 84 is positioned between bushings 78 and 80 and is held therebetween in a pivotal manner by means of pin 88 extending through bushing 80, sleeve 84 and bushing 78. Pin 88 is held in place by any suitable means such as by a cotter key or the like extending through bore 90 in pin 88.

The numeral 92 refers to a spring-lock assembly which is mounted on the front side of front side plate 66. Assembly 92 includes a box-like bracket 94 which is welded to side plate 66. A pin 96 extends through bracket 94 and has a spring 98 embracing it to yieldably urge the pin 96 towards mounting plate 60 beyond the outer side of opening 70. Assembly 92 includes means to maintain pin 96 in a retracted non-locking position in conventional fashion. Back side plate 68 includes rearwardly bent ears 100 and 102 and a U-shaped opening 104 having a semi-circular lower end 106.

A bearing block mounting plate 108 is positioned between side plates 66 and 68 adjacent the lower ends thereof and is welded thereto and to the mounting plate 62. the outer end of mounting plate 108 is provided with an upturned lip 110. The forward and rearward side edges of mounting plate 108 are provided with notches 112 and 114 formed therein which receive the lower ends of ring members 48 and 50 when pivot pin 36 is received by the saddle assembly 52. The numeral 116 refers to a bearing block which is comprised of Nylon®, plastic or a composite material. The upper surface of bearing block 116 has an elongated recessed area 118 formed therein which has a generally semi-circular cross-section. Bearing block 116 is positioned on mounting plate 108 between side plates 66 and 68 and is secured to mounting plate 108 by bolts 120 and 122 which extend downwardly through bolt openings 124 and 126 respectively in baring block 116. When bearing block 116 is positioned on mounting plate 108, the lower end 128 of the recessed area 118 dwells in a plane above the lower ends 72 and 106 of U-shaped openings 70 and 104 in side plates 66 and 68 respectively so that pivot pin 36 is held in a plane above the lower ends 72 and 106 by openings 70 and 104. The bearing block 116 prevents pivot pin 36 from engaging the lower ends 72 and 106 of openings 70 and 104. If bearing block 116 becomes worn, it is easily replaced or vertically adjusted.

As previously stated, saddle assemblies 52 and 56 are identical. Saddle assemblies 52 and 56 are positioned on the left side of the wheeled frame 10, as viewed from the rear thereof, so that the locking plates 82 will be at the forward sides of the saddle assemblies 52 and 56 and will be readily visible to the driver of the vehicle. If the saddle assembly 52 was used on the right side of the wheeled frame 10, the locking plates would be at the rearward side of the saddle assembly and would not be clearly visible from the front of the vehicle. Thus, a slight modification is made to a saddle assembly 52 so that it may be used on the right side of the vehicle. It should be noted that while it is preferred that the locking plate 82 be positioned at the forward side of the saddle assembly for observation purposes, it is not necessary.

Figure 7:
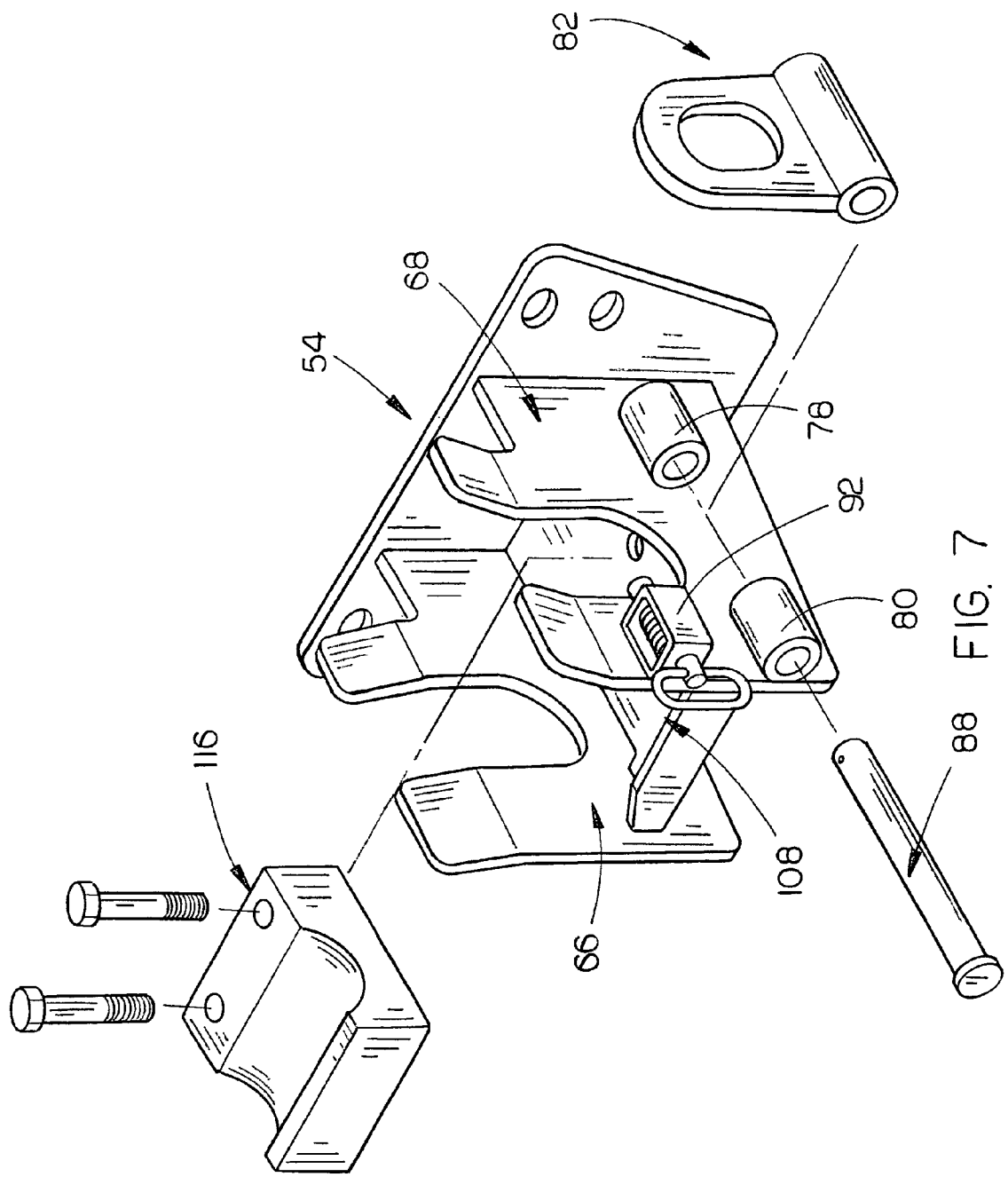
FIG. 7 is an exploded front perspective view of one of the saddle assemblies which are secured to the right side of the truck or trailer frame.

The saddle assembly 54 illustrated in FIG. 7 is different from saddle assembly in only two respects. First, the locking plate 82 on saddle assembly 54 is positioned on the forward side of side plate 68 rather than on side plate 66. Secondly, the spring-lock assembly 92 is also located on the front side of side plate 68 so as to cooperate with locking plate 68.

Figure 5:
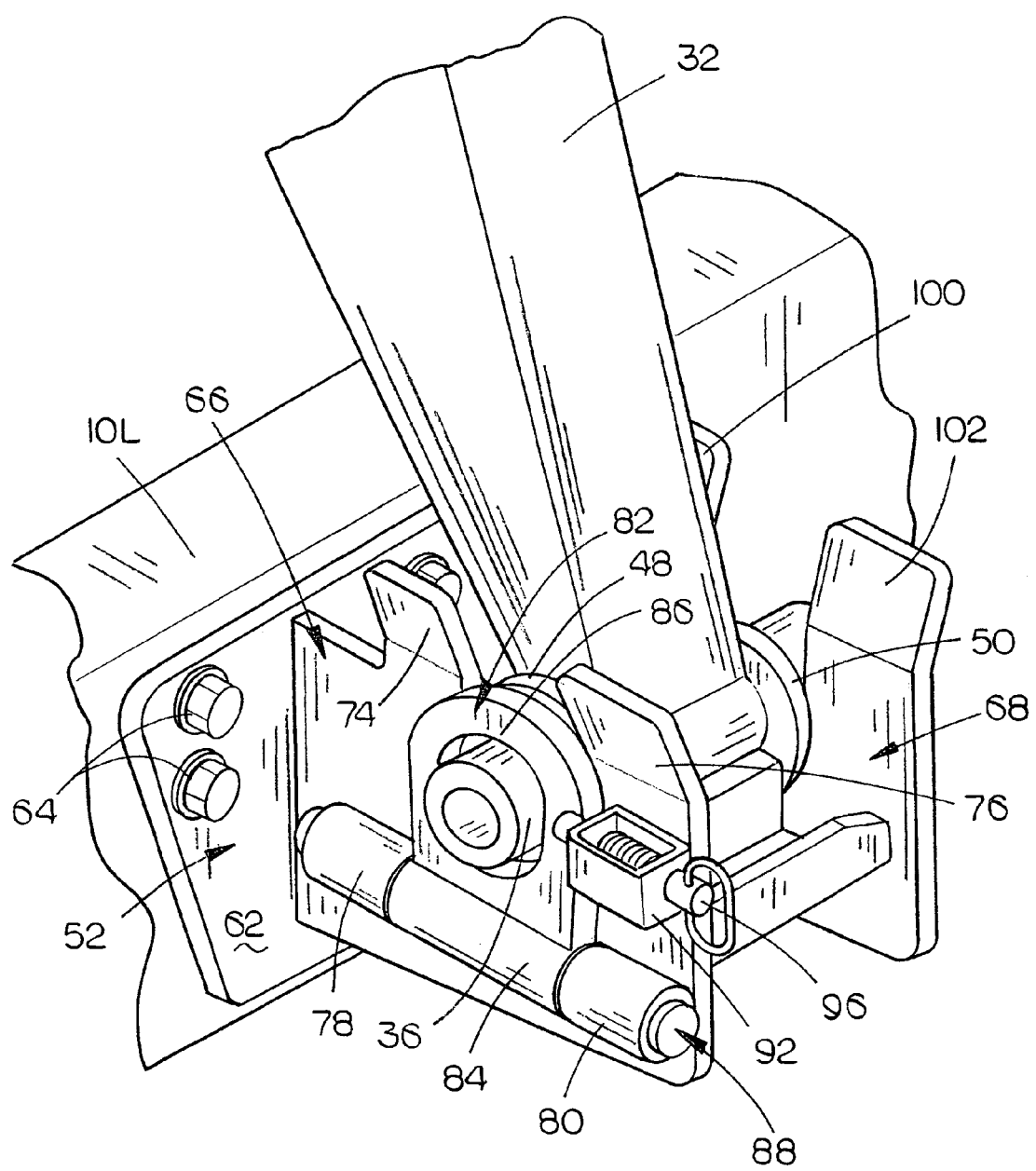
FIG. 5 is a perspective view similar to FIG. 4 except that the pivot pin is locked into the saddle assembly.
Figure 6:
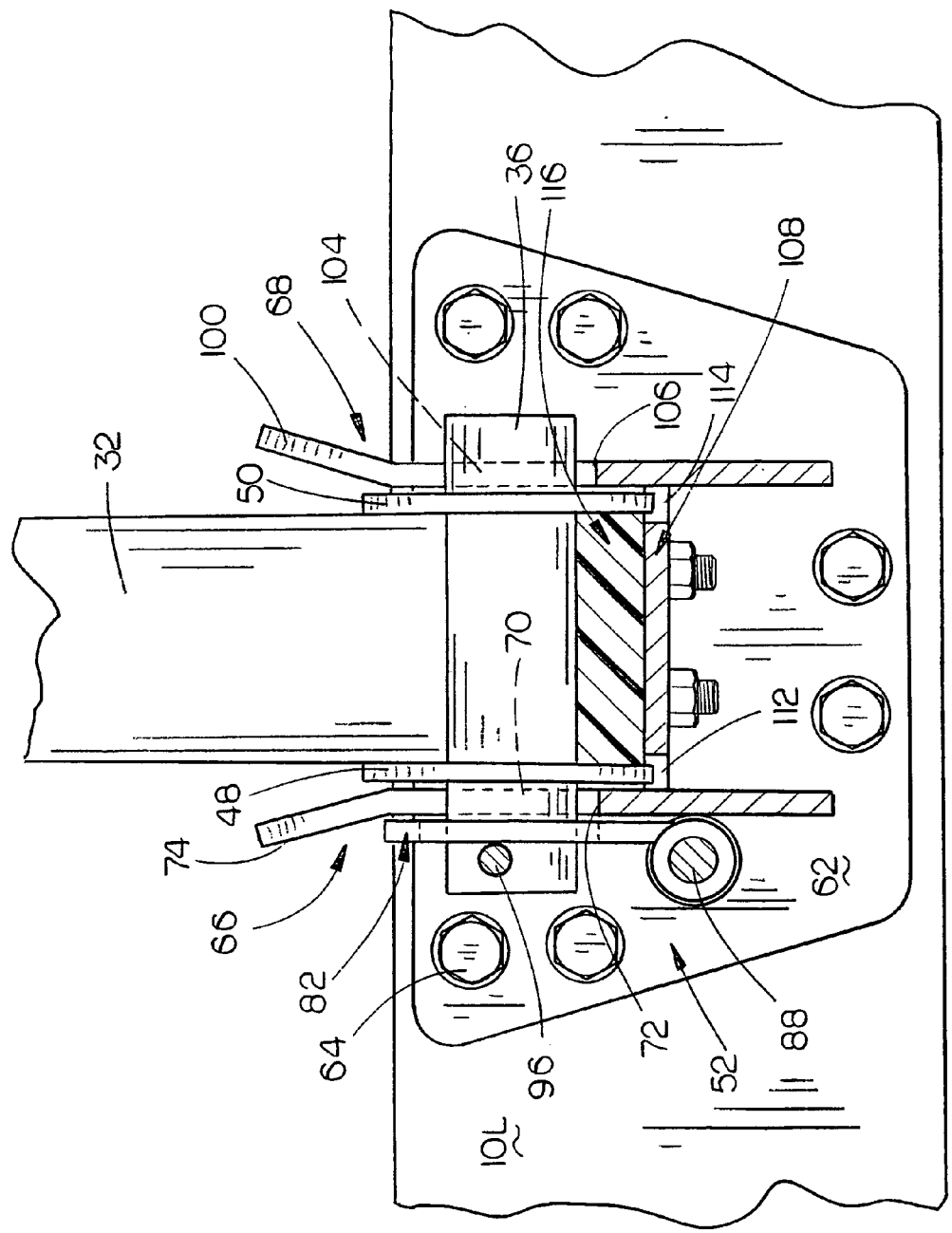
FIG. 6 is a partial sectional view of the pivot pin/saddle assembly of FIG. 3 with the pivot pin being locked into the saddle assembly.

FIG. 5 illustrates the pivot pin 36 seated within the saddle assembly 52 with the locking pin 96 being positioned outwardly of the locking plate 82 to maintain the pivot pin 36 in the saddle assembly 52. When the locking pin 36 is received within the saddle assembly 52, the lower ends of the ring members 48 and 50 are received in the notches 112 and 114 of the mounting plate 108. The close proximity of the ring members 48 and 50 to the side plates 66 and 68 limits the longitudinal movement of the pivot tube 32 and the side-dump body with respect to the saddle assembly 52. The pivot pin 36 is supported upon the bearing block 116 with the lower end of the pivot pin 36 being disposed above the lower end 72 of the opening 70 in side plate 66 and above the lower end 106 of the opening 104 in the side plate 68 thereby preventing a metal-to-metal contact between the pivot pin and the side plates. The fact that the pivot pins are secured to the lower ends of the pivot tubes and the fact that the pivot tubes are secured to the forward end wall or the rearward end wall of a side-dump body transfers any forces imposed thereon to the front bulkhead rather than to the sides of the side-dump body.

Should the bearing block 116 become worn, the bearing block 116 is easily replaced or adjustably vertically moved upwardly by inserting washers or the like beneath the bearing block 116 above the mounting plate 108.

Figure 4:
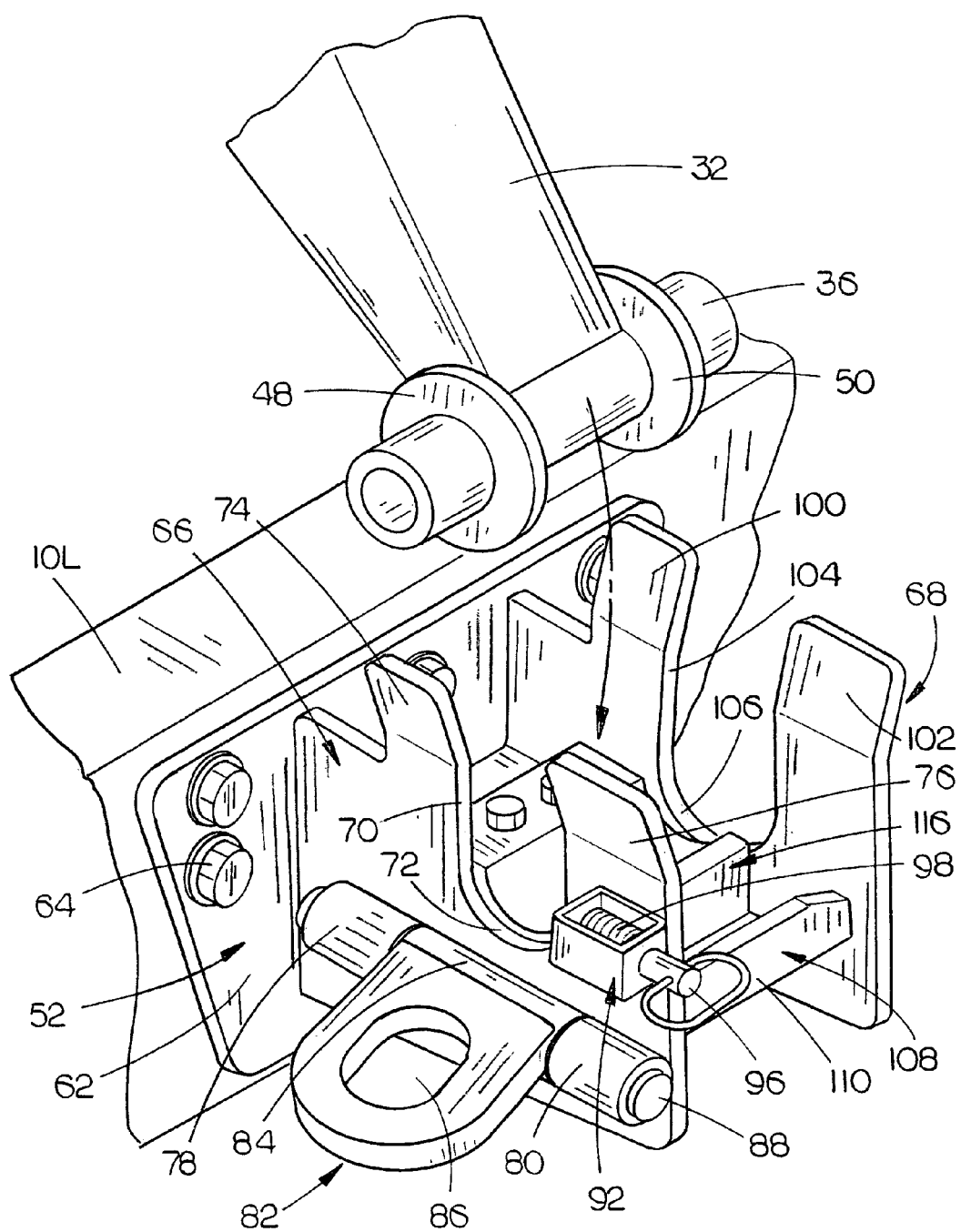
FIG. 4 is a perspective view illustrating a pivot pin being lowered into the saddle assembly of FIG. 3.

To further describe the invention and assuming that the pivot tube 32 is disposed above the saddle assembly 52 as illustrated in FIG. 4, as the pivot tube 32 is lowered, the ring members 48 and 50 may engage the portions 74, 76, 100 and 102 to move the pivot pin in a proper relationship with respect to the saddle assembly. As the pivot tube 32 is lowered with respect to the saddle assembly 52, the ring members 46 and 50 guide the pivot tube downwardly into the recessed area 118 of the bearing block 116. When the pivot pin 36 is seated in the recessed area 118 of the bearing block 116, the locking plate 82 is pivotally moved upwardly from the position of FIG. 4 to the position of FIG. 5 so that the opening 86 of the locking plate 82 receives the end of the pivot pin 36. The spring-lock assembly 92 is then actuated so that the pin 96 extends therefrom adjacent the outer side of the locking plate 82 to maintain the locking plate 82 in its locked position.

The side-dump body is pivotally movable from a transport position to a dumping position at either side of the wheeled frame by a hydraulic cylinder at the forward end of the side-dump body and a hydraulic cylinder at the rearward end of the side-dump body in conventional fashion.

Thus it can be seen that a novel pivot pin and saddle assembly has been provided for a side-dump trailer or truck which prevents metal-to-metal contact between the pivot pin and the saddle assembly and which limits the longitudinal movement of the side-dump body with respect to the saddle assembly. Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A side-dump vehicle, comprising:
   a wheeled frame having a forward end, a rearward end, a first side and a second side;
   an elongated side-dump body pivotally movably positioned on said wheeled frame and having a forward end, a rearward end, a first side and a second side;
   said body also including an upstanding front bulkhead with upper and lower ends, an upstanding back bulkhead with upper and lower ends, a first side wall having forward and rearward ends, a second side wall having forward and rearward ends, a bottom wall having forward and rearward ends, and an open upper end for receiving materials to be transported;
   a first diagonally extending pivot tube, having upper and lower ends, secured to said front bulkhead;
   said upper end of said first pivot tube being positioned adjacent said upper end of said front bulkhead;
   said first pivot tube extending downwardly and outwardly from its said upper end to its said lower end;
   a second diagonally extending pivot tube, having upper and lower ends, secured to said front bulkhead;
   said upper end of said second pivot tube being positioned adjacent said upper end of said front bulkhead;

said second pivot tube extending downwardly and outwardly from its said upper end to its said lower end;
a third diagonally extending pivot tube, having upper and lower ends, secured to said back bulkhead;
said upper end of said third pivot tube being positioned adjacent said upper end of said back bulkhead;
said third pivot tube extending downwardly and outwardly from its said upper end to its said lower end;
a fourth diagonally extending pivot tube, having upper and lower ends, secured to said back bulkhead;
said upper end of said fourth pivot tube being positioned adjacent said upper end of said back bulkhead;
said fourth pivot tube extending downwardly and outwardly from its said upper end to its said lower end;
a first horizontally disposed pivot pin, having forward and rearward ends, secured to said lower end of said first diagonally extending pivot tube;
said first pivot pin having a first disc-shaped ring member mounted thereon rearwardly of its said forward end;
said first pivot pin having a second disc-shaped ring member mounted thereon forwardly of its said rearward end;
said first and second disc-shaped ring members on said first pivot pin being horizontally spaced-apart;
a second horizontally disposed pivot pin, having forward and rearward ends, secured to said lower end of said second diagonally extending pivot tube;
said second pivot pin having a first disc-shaped ring member mounted thereon rearwardly of its said forward end;
said second pivot pin having a second disc-shaped ring member mounted thereon forwardly of its said rearward end;
said first and second disc-shaped ring members on said second pivot pin being horizontally spaced-apart;
a third horizontally disposed pivot pin, having forward and rearward ends, secured to said lower end of said third diagonally extending pivot tube;
said third pivot pin having a first disc-shaped ring member mounted thereon rearwardly of its said forward end;
said third pivot pin having a second disc-shaped ring member mounted thereon forwardly of its said rearward end;
said first and second disc-shaped ring members on said third pivot pin being horizontally spaced-apart;
a fourth horizontally disposed pivot pin, having forward and rearward ends, secured to said lower end of said fourth diagonally extending pivot tube;
said fourth pivot pin having a first disc-shaped ring member mounted thereon rearwardly of its said forward end;
said fourth pivot pin having a second disc-shaped ring member mounted thereon forwardly of its said rearward end;
said first and second disc-shaped ring members on said fourth pivot pin being horizontally spaced-apart;
a first saddle assembly secured to said wheeled frame adjacent said lower end of said first pivot tube;
a second saddle assembly secured to said wheeled frame adjacent said lower end of said second pivot tube;
a third saddle assembly secured to said wheeled frame adjacent said lower end of said third pivot tube;
a fourth saddle assembly secured to said wheeled frame adjacent said lower end of said fourth pivot tube;
said first saddle assembly including an upstanding first mounting plate secured to said wheeled frame and which has an upper end, a lower end, a forward end, a rearward end and inner and outer sides; a second mounting plate secured to said first mounting plate of said first saddle assembly and extending outwardly therefrom; said second mounting plate of said first saddle assembly having a forward end, a rearward end, an upper side, a lower side, an inner end and an outer end; an upstanding front side plate secured to said first and second mounting plates of said first saddle assembly which extends outwardly from said first mounting plate of said first saddle assembly at said forward end of said second mounting plate of said first saddle assembly; said front side plate of said first saddle assembly having an outer side, an inner side, an upper end, a lower end, an inner end and an outer end; said front side plate of said first saddle assembly having a pivot pin receiving opening formed therein which extends downwardly thereinto from said upper end thereof; said pivot pin receiving opening of said front side plate of said first saddle assembly having a semi-circular lower end; an upstanding back side plate secured to said first and second mounting plates of said first saddle assembly which extends outwardly from said first mounting plate of said first saddle assembly at said rearward end of said second mounting plate of said first saddle assembly; said back side plate of said first saddle assembly having a front side, a back side, an upper end, a lower end, an inner end and an outer end; said back side plate of said first saddle assembly having a pivot pin receiving opening formed therein which extends downwardly thereinto from said upper end thereof; said pivot pin receiving opening in said back side plate of said first saddle assembly having a semi-circular lower end;
a bearing block mounted on said second mounting plate of said first saddle assembly which is positioned between said pivot pin receiving openings in said front and back side plates of said first saddle assembly;
said first pivot pin being selectively received by said pivot pin receiving openings in said front and back side plates of said first saddle assembly and supported upon said bearing block with said first and second disc-shaped ring members thereon being positioned closely adjacent said inner sides of said front and back side plates of said first saddle assembly respectively;
and a first locking device on said first saddle assembly for selectively locking said first pivot pin in said pivot pin receiving openings in said front and back side plates of said first saddle assembly;
said second, third and fourth saddle assemblies secured to said wheeled frame for selectively receiving said second, third and fourth pivot pins therein;
said second, third and fourth saddle assemblies being substantially identical to said first saddle assembly; and
means for pivotally moving said side-dump body between a transport position to a first dumping position at said first side of said wheeled frame or to a second dumping position at said second side of said wheeled frame.

2. The side-dump vehicle of claim 1 wherein said bearing block is comprised of Nylon®.

3. The side-dump vehicle of claim 1 wherein said bearing block is comprised of a plastic material.

4. The side-dump vehicle of claim 1 wherein said bearing block of each of said saddle assemblies has an upper surface which has an elongated semi-circular recess formed therein which receives the associated pivot pin above the semi-circular lower end of the respective pivot pin receiving openings.

5. The side-dump vehicle of claim 4 wherein said bearing block is selectively removably secured to said second mounting plate of said first saddle assembly.

6. The side-dump vehicle of claim 1 wherein the upper ends of said front and back side plates are bent outwardly in an inclined manner.

7. The side-dump vehicle of claim 1 wherein said second saddle assembly includes an upstanding first mounting plate secured to said wheeled frame and which has an upper end, a lower end, a forward end, a rearward end and inner and outer sides; a second mounting plate secured to said first mounting plate of said second saddle assembly and extending outwardly therefrom; said second mounting plate of said second saddle assembly having a forward end, a rearward end, an upper side, a lower side, an inner end and an outer end; an upstanding front side plate secured to said first and second mounting plates of said second saddle assembly which extends outwardly from said first mounting plate of said second saddle assembly at said forward end of said second mounting plate of said second saddle assembly; said front side plate of said second saddle assembly having an outer side, an inner side, an upper end, a lower end, an inner end and an outer end; said front side plate of said second saddle assembly having a pivot pin receiving opening formed therein which extends downwardly thereinto from said upper end thereof; said pivot pin receiving opening of said front side plate of said second saddle assembly having a semi-circular lower end; an upstanding back side plate secured to said first and second mounting plates of said second saddle assembly which extends outwardly from said first mounting plate of said second saddle assembly at said rearward end of said second mounting plate of said second saddle assembly; said back side plate of said second saddle assembly having a front side, a back side, an upper end, a lower end, an inner end and an outer end; said back side plate of said second saddle assembly having a pivot pin receiving opening formed therein which extends downwardly thereinto from said upper end thereof; said pivot pin receiving opening in said back side plate of said second saddle assembly having a semi-circular lower end;
    a bearing block mounted on said second mounting plate of said second saddle assembly which is positioned between said pivot pin receiving openings in said front and back side plates of said second saddle assembly;
    said second pivot pin being selectively received by said pivot pin receiving openings in said front and back side plates of said second saddle assembly and supported upon said bearing block of said second saddle assembly with said first and second disc-shaped ring members on said second pivot pin being positioned closely adjacent the inner sides of said front and back side plates of said second saddle assembly;
    a locking device on said second saddle assembly for selectively locking said second pivot pin in said pivot pin receiving openings in said front and back side plates of said second saddle assembly;
    said third saddle assembly including an upstanding first mounting plate secured to said wheeled frame and which has an upper end, a lower end, a forward end, a rearward end and inner and outer sides; a second mounting plate secured to said first mounting plate of said third saddle assembly and extending outwardly therefrom; said second mounting plate of said third saddle assembly having a forward end, a rearward end, an upper side, a lower side, an inner end and an outer end; an upstanding front side plate secured to said first and second mounting plates of said third saddle assembly which extends outwardly from said first mounting plate of said third saddle assembly at said forward end of said second mounting plate of said third saddle assembly; said front side plate of said third saddle assembly having an outer side, an inner side, an upper end, a lower end, an inner end and an outer end; said front side plate of said third saddle assembly having a pivot pin receiving opening formed therein which extends downwardly thereinto from said upper end thereof; said pivot pin receiving opening of said front side plate of said third saddle assembly having a semi-circular lower end; an upstanding back side plate secured to said first and second mounting plates of said third saddle assembly which extends outwardly from said first mounting plate of said third saddle assembly at said rearward end of said second mounting plate of said third saddle assembly; said back side plate of said third saddle assembly having a front side, a back side, an upper end, a lower end, an inner end and an outer end; said back side plate of said third saddle assembly having a pivot pin receiving opening formed therein which extends downwardly thereinto from said upper end thereof; said pivot pin receiving opening in said back side plate of said third saddle assembly having a semi-circular lower end;
    a bearing block mounted on said second mounting plate of said third saddle assembly, which is positioned between said pivot pin receiving openings in said front and back side plates of said third saddle assembly;
    said third pivot pin being selectively received by said pivot pin receiving openings in said front and back side plates of said third saddle assembly and supported upon said bearing block of said third saddle assembly with said first and second ring members on said third pivot pin being positioned closely adjacent the inner sides of said front and back side plates of said third saddle assembly;
    and a locking device on said third saddle assembly for selectively locking said third pivot pin in said pivot pin receiving openings in said front and back side plates of said third saddle assembly;
    said fourth saddle assembly including an upstanding first mounting plate secured to said wheeled frame and which has an upper end, a lower end, a forward end, a rearward end and inner and outer sides; a second mounting plate secured to said first mounting plate of said fourth saddle assembly and extending outwardly therefrom; said second mounting plate of said fourth saddle assembly having a forward end, a rearward end, an upper side, a lower side, an inner end and an outer end; an upstanding front side plate secured to said first and second mounting plates of said fourth saddle assembly which extends outwardly from said first mounting plate of said fourth saddle assembly at said forward end of said second mounting plate of said fourth saddle assembly; said front side plate of said fourth saddle assembly having an outer side, an inner side, an upper end, a lower end, an inner end and an outer end; said front side plate of said fourth saddle assembly having a pivot pin receiving opening formed therein which extends downwardly thereinto from said upper end thereof; said pivot pin receiving opening of said first side plate of said fourth saddle assembly having a semi-circular lower end; an upstanding back side plate secured to said first and second mounting plates of said fourth saddle assembly which extends outwardly from said first mounting plate of said fourth saddle assembly at said rearward end of said second mounting plate of said fourth saddle assembly; said back side plate of said fourth saddle assembly having a front side, a back side, an upper end, a lower end, an inner end and an outer end; said back side plate of said fourth saddle assembly having a pivot pin receiving opening formed therein which extends downwardly thereinto from said upper end thereof; said pivot pin receiving opening in said back side plate of said fourth saddle assembly having a semi-circular lower end;

a bearing block mounted on said second mounting plate of said fourth saddle assembly which is positioned between said pivot pin receiving openings in said front and back side plates of said fourth saddle assembly;

said fourth pivot pin being selectively received by said pivot pin receiving openings in said front and back side plates of said fourth saddle assembly and supported upon said bearing block of said fourth saddle assembly with said first and second ring members on said fourth pivot pin being positioned closely adjacent the inner sides of said front and back side plates of said fourth saddle assembly;

and a locking device on said fourth saddle assembly for selectively locking said fourth pivot pin in said pivot pin receiving openings in said front and back side plates of said fourth saddle assembly.

8. The structure of claim 7 wherein each of the second mounting plates of said first, second, third and fourth saddle assemblies have first and second notches formed therein which are adapted to receive the first and second ring members of the respective pivot pin.

9. A side-dump vehicle, comprising:

a wheeled frame having a forward end, a rearward end, a first side and a second side;

an elongated side-dump body movably positioned on said wheeled frame and having a forward end, a rearward end, a first side and a second side;

said body also including an upstanding front bulkhead with upper and lower ends, an upstanding back bulkhead with upper and lower ends, a first side wall having forward and rearward ends, a second side wall having forward and rearward ends, a bottom wall having forward and rearward ends, and an open upper end for receiving materials to be transported;

a first horizontally disposed pivot pin, having forward and rearward ends, secured to said side-dump body at said first side adjacent the forward end thereof;

a second horizontally disposed pivot pin, having forward and rearward ends, secured to said side-dump body at said second side adjacent the forward end thereof;

a third horizontally disposed pivot pin, having forward and rearward ends, secured to said side-dump body at said first side adjacent the rearward end thereof;

a fourth horizontally disposed pivot pin, having forward and rearward ends, secured to said side-dump body at said second side adjacent the rearward end thereof;

each of said first, second, third and fourth pivot pins having horizontally spaced-apart front and back disc-shaped ring members mounted thereon;

a first saddle assembly secured to said wheeled frame for selectively receiving said first pivot pin;

a second saddle assembly secured to said wheeled frame for selectively receiving said second pivot pin;

a third saddle assembly secured to said wheeled frame for selectively receiving said third pivot pin;

a fourth saddle assembly secured to said wheeled frame for selectively receiving said fourth pivot pin;

said first saddle assembly including an upstanding first mounting plate secured to said wheeled frame and which has an upper end, a lower end, a forward end, a rearward end and inner and outer sides; a second mounting plate secured to said first mounting plate of said first saddle assembly and extending outwardly therefrom; said second mounting plate of said first saddle assembly having a forward end, a rearward end, an upper side, a lower side, an inner end and an outer end; an upstanding front side plate secured to said first and second mounting plates of said first saddle assembly which extends outwardly from said first mounting plate of said first saddle assembly at said forward end of said second mounting plate of said first saddle assembly; said front side plate of said first saddle assembly having an outer side, an inner side, an upper end, a lower end, an inner end and an outer end; said front side plate of said first saddle assembly having a pivot pin receiving opening formed therein which extends downwardly thereinto from said upper end of said front side plate of said first saddle assembly; said pivot pin receiving opening of said front side plate of said first saddle assembly having a semi-circular lower end; an upstanding back side plate secured to said first and second mounting plates of said first saddle assembly which extends outwardly from said first mounting plate of said first saddle assembly at said rearward end of said second mounting plate of said first saddle assembly; said back side plate of said first saddle assembly having a front side, a back side, an upper end, a lower end, an inner end and an outer end; said back side plate of said first saddle assembly having a pivot pin receiving opening formed therein which extends downwardly thereinto from said upper end thereof; said pivot pin receiving opening in said back side plate of said first saddle assembly having a semi-circular lower end;

a bearing block mounted on said second mounting plate of said first saddle assembly which is positioned between said pivot pin receiving openings in said front and back side plates of said first saddle assembly;

said first pivot pin being selectively received by said pivot pin receiving openings in said front and back side plates of said first saddle assembly and supported upon said bearing block of said first saddle assembly with said front and back disc-shaped ring members of said first pivot pin being positioned closely adjacent the inner sides of said front and back side plates of said first saddle assembly, respectively;

and a first locking device on said first saddle assembly for selectively locking said first pivot pin in said pivot pin receiving openings in said front and back side plates of said first saddle assembly;

said second, third and fourth saddle assemblies being substantially identical to said first saddle assembly.

10. The side-dump vehicle of claim 9 wherein said bearing block is comprised of Nylon®.

11. The side-dump vehicle of claim 9 wherein said bearing block is comprised of a plastic material.

12. The side-dump vehicle of claim 9 wherein said bearing block of said first saddle assembly has an upper surface which has an elongated semi-circular recess formed therein which receives said first pivot pin above said semi-circular lower end of the pivot pin receiving openings in said front and back side plates of said first saddle assembly.

13. The side-dump vehicle of claim 12 wherein said bearing block of said first saddle assembly is selectively removably secured to said second mounting plate of said first saddle assembly.

14. The side-dump vehicle of claim 9 wherein said upper ends of said front and back side plates of said first saddle assembly are bent outwardly in an inclined manner.

15. The side-dump vehicle of claim 9 wherein said second saddle assembly includes an upstanding first mounting plate secured to said wheeled frame and which has an upper end, a lower end, a forward end, a rearward end and inner and outer sides; a second mounting plate secured to said first mounting plate of said second saddle assembly and extending outwardly therefrom; said second mounting plate of said second saddle assembly having a forward end, a rearward end, an upper side, a lower side, an inner end and an outer end; an upstanding front side plate secured to said first and second mounting plates of said second saddle assembly which extends outwardly from said first mounting plate of said second saddle assembly at said forward end of said second mounting plate of said second saddle assembly; said front side plate of said second saddle assembly having an outer side, an inner side, an upper end, a lower end, an inner end and an outer end; said front side plate of said second saddle assembly having a pivot pin receiving opening formed therein which extends downwardly thereinto from said upper end thereof; said pivot pin receiving opening of said front side plate of said second saddle assembly having a semi-circular lower end; an upstanding back side plate secured to said first and second mounting plates of said second saddle assembly which extends outwardly from said first mounting plate of said second saddle assembly at said rearward end of said second mounting plate; said back side plate of said second saddle assembly having a front side, a back side, an upper end, a lower end, an inner end and an outer end; said back side plate of said second saddle assembly having a pivot pin receiving opening formed therein which extends downwardly thereinto from said upper end thereof; said pivot pin receiving opening in said back side plate of said second saddle assembly having a semi-circular lower end;

a bearing block mounted on said second mounting plate of said second saddle assembly which is positioned between said pivot pin receiving openings in said front and back side plates of said second saddle assembly;

said second pivot pin being selectively received by said pivot pin receiving openings in said front and back side plates of said second saddle assembly and supported upon said bearing block of said second saddle assembly with said front and back disc-shaped ring members thereon being positioned closely adjacent the inner sides of said front and back side plates of said second saddle assembly, respectively;

a locking device on said second saddle assembly for selectively locking said second pivot pin in said pivot pin receiving openings in said front and back side plates of said second saddle assembly;

said third saddle assembly including an upstanding first mounting plate secured to said wheeled frame and which has an upper end, a lower end, a forward end, a rearward end and inner and outer sides; a second mounting plate secured to said first mounting plate of said third saddle assembly and extending outwardly therefrom; said second mounting plate of said third saddle assembly having a forward end, a rearward end, an upper side, a lower side, an inner end and an outer end; an upstanding front side plate secured to said first and second mounting plates of said third saddle assembly which extends outwardly from said first mounting plate of said third saddle assembly at said forward end of said second mounting plate of said third saddle assembly; said front side plate of said third saddle assembly having an outer side, an inner side, an upper end, a lower end, an inner end and an outer end; said front side plate of said third saddle assembly having a pivot pin receiving opening formed therein which extends downwardly thereinto from said upper end thereof; said pivot pin receiving opening of said front side plate of said third saddle assembly having a semi-circular lower end; an upstanding back side plate secured to said first and second mounting plates of said third saddle assembly which extends outwardly from said first mounting plate of said third saddle assembly at said rearward end of said second mounting plate of said third saddle assembly; said back side plate of said third saddle assembly having a front side, a back side, an upper end, a lower end, an inner end and an outer end; said back side plate of said third saddle assembly having a pivot pin receiving opening formed therein which extends downwardly thereinto from said upper end thereof; said pivot pin receiving opening in said back side plate of said third saddle assembly having a semi-circular lower end;

a bearing block mounted on said second mounting plate of said third saddle assembly which is positioned between said pivot pin receiving openings in said front and back side plates of said third saddle assembly;

said third pivot pin being selectively received by said pivot pin receiving openings in said front and back side plates of said third saddle assembly and supported upon said bearing block of said third saddle assembly with said front and back disc-shaped ring members thereon being positioned closely adjacent the inner sides of said front and back side plates respectively;

and a locking device on said third saddle assembly for selectively locking said third pivot pin in said pivot pin receiving openings in said front and back side plates of said third saddle assembly;

said fourth saddle assembly including an upstanding first mounting plate secured to said wheeled frame and which has an upper end, a lower end, a forward end, a rearward end and inner and outer sides; a second mounting plate secured to said first mounting plate of said fourth saddle assembly and extending outwardly therefrom; said second mounting plate of said fourth saddle assembly having a forward end, a rearward end, an upper side, a lower side, an inner end and an outer end; an upstanding front side plate secured to said first and second mounting plates of said fourth saddle assembly which extends outwardly from said first mounting plate of said fourth saddle assembly at said forward end of said second mounting plate of said fourth saddle assembly; said front side plate of said fourth saddle assembly having an outer side, an inner side, an upper end, a lower end, an inner end and an outer end; said front side plate of said fourth saddle assembly having a pivot pin receiving opening formed therein which extends downwardly thereinto from said upper end thereof; said pivot pin receiving opening of said front side plate of said fourth saddle assembly having a semi-circular lower end; an upstanding back side plate secured to said first and second mounting plates of said fourth saddle assembly which extends outwardly from said first mounting plate of said fourth saddle assembly at said rearward end of said second mounting plate of said fourth saddle assembly; said back side plate of said fourth saddle assembly having a front side, a back side, an upper end, a lower end, an inner end and an outer end; said back side plate of said fourth saddle assembly having a pivot pin receiving opening formed therein which extends downwardly thereinto from said upper end thereof; said pivot pin receiving opening in said back side plate of said fourth saddle assembly having a semi-circular lower end;

a bearing block mounted on said second mounting plate of said fourth saddle assembly which is positioned between said pivot pin receiving openings in said front and back side plates of said fourth saddle assembly;

said fourth pivot pin being selectively received by said pivot pin receiving openings in said front and back side plates of said fourth saddle assembly and supported upon said bearing block of said fourth saddle assembly with said front and back disc-shaped ring members thereon being positioned closely adjacent the inner sides of said front and back side plates of said fourth saddle assembly, respectively;

and a locking device on said fourth saddle assembly for selectively locking said fourth pivot pin in said pivot pin receiving openings in said front and back side plates of said fourth saddle assembly.

16. The structure of claim 9 wherein each of the second mounting plates of the saddle assemblies have first and second notches formed therein which are adapted to receive the front and back disc-shaped ring members of the respective pivot pin.

17. A side-dump vehicle, comprising:
a wheeled frame having a forward end, a rearward end, a first side and a second side;
an elongated side-dump body movably positioned on said wheeled frame and having a forward end, a rearward end, a first side and a second side;
said side-dump body also including an upstanding front bulkhead with upper and lower ends, an upstanding back bulkhead with upper and lower ends, a first side wall having forward and rearward ends, a second side wall having forward and rearward ends, a bottom wall having forward and rearward ends, and an open upper end for receiving materials to be transported;
a first horizontally disposed pivot pin, having forward and rearward ends, secured to said side-dump body at said first side of said side-dump body adjacent said forward end of said side-dump body;
a second horizontally disposed pivot pin, having forward and rearward ends, secured to said side-dump body at said second side of said side-dump body adjacent the forward end of said side-dump body;
a third horizontally disposed pivot pin, having forward and rearward ends, secured to said side-dump body at said first side of said side-dump body adjacent said rearward end of said side-dump body;
a fourth horizontally disposed pivot pin, having forward and rearward ends, secured to said side-dump body at said second side of said side-dump body adjacent said rearward end of said side-dump body;
a first saddle assembly secured to said wheeled frame for selectively receiving said first pivot pin;
a second saddle assembly secured to said wheeled frame for selectively receiving said second pivot pin;
a third saddle assembly secured to said wheeled frame for selectively receiving said third pivot pin;
a fourth saddle assembly secured to said wheeled frame for selectively receiving said fourth pivot pin;
each of said saddle assemblies including spaced-apart front and back side plates, having upper and lower ends;
each of said front and back side plates of each of said saddle assemblies having a pivot pin receiving opening extending downwardly thereinto from said upper end thereof;
each of said saddle assemblies having a non-metallic bearing block positioned between said front and back side plates thereof upon which the respective pivot pin is pivotally supported; and
means for pivotally moving said side-dump body between a transport position to a first dumping position at said first side of said wheeled frame or to a second dumping position at said second side of said wheeled frame.

18. The side-dump vehicle of claim 17 wherein said bearing block is comprised of Nylon®.

19. The side-dump vehicle of claim 17 wherein said bearing block is comprised of a composite material.

20. The side-dump vehicle of claim 17 wherein each of said pivot pin receiving openings of said front and back side plates of each of said saddle assemblies have a lower end and wherein each of said respective bearing blocks have an upper bearing surface which dwells in a plane above said lower ends of the respective pivot pin receiving openings in the respective front and back side plates of the respective saddle assembly to prevent the respective pivot pin from engaging the lower ends of the respective pivot pin receiving openings.

* * * * *